United States Patent
Soria

(10) Patent No.: US 12,221,585 B2
(45) Date of Patent: Feb. 11, 2025

(54) METHOD FOR MINIMIZING FOULING, CORROSION, AND SOLVENT DEGRADATION IN LOW-TEMPERATURE REFINERY AND NATURAL GAS PROCESSES

(71) Applicant: BL TECHNOLOGIES, INC., Minnetonka, MN (US)

(72) Inventor: John Soria, Minnetonka, MN (US)

(73) Assignee: BL TECHNOLOGIES, INC., Minnetonka, MN (US)

( * ) Notice: Subject to any disclaimer, the term of this patent is extended or adjusted under 35 U.S.C. 154(b) by 186 days.

(21) Appl. No.: 17/787,504

(22) PCT Filed: Dec. 16, 2020

(86) PCT No.: PCT/US2020/065184
§ 371 (c)(1),
(2) Date: Jun. 20, 2022

(87) PCT Pub. No.: WO2021/126892
PCT Pub. Date: Jun. 24, 2021

(65) Prior Publication Data
US 2023/0017553 A1    Jan. 19, 2023

Related U.S. Application Data

(60) Provisional application No. 62/951,076, filed on Dec. 20, 2019.

(51) Int. Cl.
*C10G 75/02* (2006.01)
*B01D 53/14* (2006.01)
*C02F 1/20* (2023.01)
*C02F 1/68* (2023.01)
*C10G 75/04* (2006.01)

(52) U.S. Cl.
CPC ......... *C10G 75/02* (2013.01); *B01D 53/1493* (2013.01); *C02F 1/20* (2013.01); *C02F 1/683* (2013.01); *C10G 75/04* (2013.01); *B01D 2252/2023* (2013.01); *B01D 2252/602* (2013.01); *B01D 2252/604* (2013.01); *C02F 2303/08* (2013.01); *C10G 2300/4075* (2013.01); *C10G 2300/70* (2013.01)

(58) Field of Classification Search
CPC C10G 75/02; C10G 75/04; C10G 2300/4075; C10G 2300/70; B01D 53/1493; B01D 2252/2023; B01D 2252/602; B01D 2252/604; B01D 2252/20484; B01D 53/8671; B01D 53/02; B01D 2252/20489; B01D 2252/205; B01D 2253/20; B01D 2256/24; B01D 2256/245; B01D 2257/104; B01D 53/46; C02F 1/20; C02F 1/683; C02F 2303/08
See application file for complete search history.

(56) References Cited

U.S. PATENT DOCUMENTS

| | | |
|---|---|---|
| 4,067,690 A | 1/1978 | Cuisia et al. |
| 4,278,635 A | 7/1981 | Kerst |
| 4,279,767 A | 7/1981 | Muccitelli |
| 4,289,645 A | 9/1981 | Muccitelli |
| 4,350,606 A | 9/1982 | Cuisia et al. |
| 4,487,745 A | 12/1984 | Weiss et al. |
| 4,626,411 A | 12/1986 | Nemes et al. |
| 4,728,497 A | 3/1988 | Muccitelli |
| 4,734,258 A | 3/1988 | Cosper |
| 4,810,405 A | 3/1989 | Waller et al. |
| 4,824,784 A | 4/1989 | Cantarow |
| 4,847,001 A | 7/1989 | Cuisia et al. |
| 4,859,418 A | 8/1989 | Ohlendorf et al. |
| 4,910,340 A | 3/1990 | Marans et al. |
| 4,980,128 A | 12/1990 | Cuisia et al. |
| 5,091,108 A | 2/1992 | Harder et al. |
| 5,094,814 A | 3/1992 | Soderquist et al. |
| 5,108,624 A | 4/1992 | Bossler et al. |
| 5,144,618 A | 9/1992 | Goto et al. |
| 5,164,110 A | 11/1992 | Haraer et al. |
| 5,167,835 A | 12/1992 | Harder |
| 5,173,213 A | 12/1992 | Miller et al. |
| 5,176,849 A | 1/1993 | Hwa et al. |
| 5,178,796 A | 1/1993 | Gewanter et al. |
| 5,256,311 A * | 10/1993 | Rossi ................ C02F 1/20  210/757 |
| 5,256,391 A | 10/1993 | Chen et al. |
| 5,288,907 A | 2/1994 | Sherwin et al. |
| 5,766,548 A | 6/1998 | Soria |

(Continued)

FOREIGN PATENT DOCUMENTS

| | | |
|---|---|---|
| CA | 1338488 C | 7/1996 |
| DE | 10345820 A1 | 4/2005 |

(Continued)

OTHER PUBLICATIONS

Wang et al, Biosensor-based therapy powered by synthetic biology (Year: 2023).*

(Continued)

*Primary Examiner* — Randy Boyer
*Assistant Examiner* — Juan C Valencia
(74) *Attorney, Agent, or Firm* — McCarter & English, LLP

(57) ABSTRACT

A method of oxygen scavenging, the method (i) providing an oxygen scavenger composition; and (ii) adding the oxygen scavenger composition to an aqueous feed and/or a hydrocarbon feed of a hydrocarbon processing system.

17 Claims, No Drawings

(56) References Cited

U.S. PATENT DOCUMENTS

| | | | | |
|---|---|---|---|---|
| 6,299,836 | B1 * | 10/2001 | Veldman | ................ C10G 75/02 |
| | | | | 507/939 |
| 7,112,284 | B2 | 9/2006 | Shimura et al. | |
| 2015/0090640 | A1 | 4/2015 | Dale | |

FOREIGN PATENT DOCUMENTS

| | | | |
|---|---|---|---|
| EP | 0505633 | B1 | 12/1994 |
| EP | 1531193 | B1 | 8/2012 |

OTHER PUBLICATIONS

"Oxygen Scavengers", Arkema Inc., QC173, 2001, 4 pages.

Ibrahim et al., "Investigation of the Fouling Mechanisms in the Heat Exchangers of a Hydrotreater", Engineering Journal of the University of Qatar, vol. 18, 2005, pp. 9-14, accessed online at URL: https://www.researchgate.net/publication/39018887_Investigation_of_the_Fouling_Mechanisms_in_the_Heat_Exchangers_of_a_Hydrotreater.

Orea et al., "Fouling Phenomena in Phenolic Sour Water Stripping Units during Heavy Oil Upgrading Operations: A Spectroscopic Characterization Approach", HOLA15-128, Sep. 2015, accessed online at URL: https://www.researchgate.net/profile/Jenny_Bruzual/publication/286937544_Fouling_Phenomena_in_Phenolic_Sour_Water_Stripping_Units_during_Heavy_Oil_Upgrading_Operations_A_Spectroscopic_Characterization_Approach/links/57b1c69508ae0101f17a4d7a.pdf?origin=publication_list.

International Search Report and Written Opinion for International Application No. PCT/US2020/065184, mailed Mar. 12, 2021, 12 pages.

Supplemental Search Report from related CN Application No. 202080088753.6 dated Nov. 4, 2024 with machine translation.

* cited by examiner

METHOD FOR MINIMIZING FOULING, CORROSION, AND SOLVENT DEGRADATION IN LOW-TEMPERATURE REFINERY AND NATURAL GAS PROCESSES

CROSS REFERENCE TO RELATED APPLICATION

This application is a national phase of International Patent Application No. PCT/US2020/065184 filed Dec. 16, 2020, which claims the priority benefit of U.S. Provisional Patent Application Ser. No. 62/951,076 filed Dec. 20, 2019, the entireties of which is incorporated herein by reference.

FIELD OF INVENTION

The disclosed technology generally provides for an oxygen scavenger composition and method of oxygen scavenging, and more specifically, an oxygen scavenger composition and method of oxygen scavenging to minimize corrosion, fouling and/or chemical degradation in refinery or natural gas processing applications.

BACKGROUND OF THE INVENTION

It is widely known that presence of dissolved oxygen in refinery and natural gas processes can lead to a multitude of severe adverse effects, including fouling and corrosion. Examples of the adverse effects caused by dissolved oxygen are: (1) fouling caused by polymerization of unstable hydrocarbon compounds where oxygen is either an initiating or a contributing factor; (2) degradation of amine and glycols to organic acids such as formic, acetic, oxalic, glycolic, and other degradation products such as aldehydes and bicine; and/or (3) corrosion caused by direct oxygen attack on metals surfaces or indirectly by the action of organic acids resulting from amine and glycol degradation and other corrosive compounds entering with the feed to these processes such as thiocyanides, thiosulfates, chlorides, etc.

For example, sour water stripping is a refinery process in which either external steam, or steam generated by a reboiler is used to remove ammonia and $H_2S$ out from sour water. Heaters, reboilers and tower internals of phenolic sour water strippers foul significantly over short periods of time, and must be taken out of line for cleaning. In such processes, the main cause of organic fouling is polymerization of phenols triggered by dissolved oxygen in the sour water feed and are accelerated by corrosion products and higher temperatures.

Sour hydrocarbon liquids and gases are treated in amine processing plants that primarily remove hydrogen sulfide, carbon dioxide, carbonyl sulfide, and carbon disulfide depending on the specific application. Such applications include, but are not limited to, refineries, natural gas plants, natural gas liquid (NGL) plants, coal gasification plants, ammonia plants, and hydrogen production.

Similarly to sour water strippers, dissolved oxygen triggers fouling mechanisms when unstable hydrocarbons, such as olefins, are present in the feed to the gas/liquid and liquid/liquid amine absorbers. The polymers formed accumulate at the bottom and in trays of amine contactors, foul lean/rich exchangers, and find their way to the amine regenerators. Excessive fouling decreases treating capacity, could lead to amine losses due to entrainment, and could force the refinery or gas plant to reduce capacity ultimately resulting in expensive and time-consuming cleaning operations both on and off-line.

Further, similar to amine gas treatment plants, dissolved oxygen entering glycol dehydration units tend to break down the circulating glycol-based dehydration agent (primarily triethylene glycol), which results in the formation of organic acids, such as formic, acetic, oxalic, and glycolic acids. These acids lower the glycol pH, thus accelerating corrosion rates. Dissolved oxygen also triggers polymerization of unstable gaseous components much like in the case of sour water strippers. The combination of corrosion products and polymers ultimately lead to reduced production rates, excessive glycol losses due to entrainment, and associated downstream problems. Glycol dehydration units are very similar to amine treating units in that the glycol absorbs water in the contactor and it releases it in the regenerator by applying heat at lower pressures.

Oxygen scavengers have long been used in boiler water and steam systems to inhibit corrosion. Recognizing the effective use of oxygen scavengers in boiler water systems, various oxygen scavengers have been applied to amine gas treating plants to inhibit corrosion. However, oxygen scavengers are infrequently used in sour water strippers, and almost never used in glycol dehydration units to reduce corrosion potential.

Thus, what is needed in the art is a method for minimizing corrosion, fouling and/or chemical degradation due to oxygen in refinery or natural gas processing applications.

SUMMARY OF THE INVENTION

The disclosed technology generally provides for an oxygen scavenger composition and method of oxygen scavenging, and more specifically, an oxygen scavenger composition and method of oxygen scavenging to minimize corrosion, fouling and/or chemical degradation in refinery or natural gas processing applications.

In one aspect of the disclosed technology, a method of oxygen scavenging, the method comprising: (i) providing an oxygen scavenger composition; and (ii) adding the oxygen scavenger composition to an aqueous feed and/or a hydrocarbon feed of a hydrocarbon processing system.

In some embodiments, the oxygen scavenger composition comprises a hydroxyalkylhydroxylamine and a catalyst. In some embodiments, the hydroxyalkylhydroxylamine is N,N-bis(2-hydroxypropyl)hydroxylamine (HPHA). In some embodiments, the oxygen scavenger composition is a blend.

In some embodiments, the catalyst is a quinone catalyst. In some embodiments, the quinone catalyst is hydroquinone, benzoquinone, or a blend thereof. In some embodiments, the hydroxyalkylhydroxylamine is N,N-bis(2-hydroxypropyl)hydroxylamine (HPHA) and the catalyst is hydroquinone. In some embodiments, the oxygen scavenger composition further comprises N,N-bis(2-hydroxyethyl)hydroxylamine (HEHA), N,N-bis(2-hydroxybutyl)-hydroxylamine (HBHA), and/or diethylhydroxylamine (DEHA). In some embodiments, the ratio of N,N-bis(2-hydroxypropyl)hydroxylamine (HPHA) to hydroquinone is about 0.0001:100 to about 100:0.0001.

In some embodiments, the oxygen scavenger composition is added to the aqueous and/or hydrocarbon feed in an amount of 0.0001 ppm to about 50,000 ppm. In some embodiments, the aqueous and/or hydrocarbon feed comprises dissolved oxygen in a range of about 0.0001 ppm to about 50,000 ppm.

In some embodiments, the aqueous feed comprises hydrocarbons, hydrogen sulfide, carbon dioxide, organic acids, phenols, dissolved minerals, alkanolamines, glycols, and/or oxygen. In some embodiments, the hydrocarbon feed is a sour gas or a liquid stream, or a blend thereof.

In some embodiments, the hydrocarbon processing system is a refinery, a natural gas processing system, a coal gasification plant, or an ammonia plant. In some embodiments, the aqueous and/or hydrocarbon processing system comprises a sour water stripper, a glycol dehydration unit, or a hydrocarbon gas processing unit.

In some embodiments, the hydrocarbon processing system is operated at a temperature range of about 40° F. to about 500° F. In some embodiments, the temperature range is less than 300° F.

DETAILED DESCRIPTION OF EXEMPLARY EMBODIMENTS

The disclosed technology generally provides for an oxygen scavenger composition and method of oxygen scavenging, and more specifically, an oxygen scavenger composition and method of oxygen scavenging to minimize corrosion, fouling and/or chemical degradation in refinery or natural gas processing applications. The present technology can be used in applications such as, but are not limited to, 1) amine treating in refineries and gas plants in both upstream and downstream applications, or other applications such as coal gasification, ammonia plants, hydrogen production, or the like; 2) glycol dehydration in upstream and midstream applications; 3) sour water strippers; and/or 4) can be beneficial in desalters, feed/effluent exchangers in hydrotreaters, and other refinery applications where oxygen is suspected of participating in fouling mechanisms, either alone, or in combination with other compounds.

The present technology minimizes the severe adverse effects caused by dissolved oxygen entering sour water strippers, gas sweetening processes using alkanolamines, and/or glycol dehydration units by using catalyzed hydroxyalkylhydroxylamines as low-temperature oxygen scavengers. The disclosed scavenger composition and method exhibits a faster reaction rate (i.e. improved kinetics) with oxygen as compared to other types of catalyzed hydroxyalkylhydroxylamines presently used (e.g. DEHA/HQ). With such improved kinetics, dissolved oxygen will be consumed before it can cause the harmful effects of fouling, corrosion, and solvent degradation in refinery or natural gas processing applications. Further, the faster reaction rate will assure that a more uniform protective layer of magnetite is formed on equipment.

Additionally, the present technology provides for protection against the formation of polymers (or oxygen-triggered polymerization), which results in fouling deposits in equipment and on heat transfer surfaces. Such protection will be more complete as compared to other conventional technologies, since it is believed that oxygen will be completely consumed before the process reaches higher temperatures and where fouling rates quickly accelerate. Therefore, the fouling tendency in refinery or natural gas processing applications will be reduced significantly because the traffic of corrosion products (which act as polymerization catalysts) will be significantly lower by having a system uniformly protected against corrosion.

In one aspect of the disclosed technology, a method for oxygen scavenging is provided. The method comprises (i) providing an oxygen scavenger composition; and (ii) adding the oxygen scavenger composition to an aqueous feed and/or a hydrocarbon feed of a hydrocarbon processing system.

In one embodiment, the oxygen scavenger composition comprises a hydroxyalkylhydroxylamine and a catalyst. The oxygen scavenger composition will form a corrosion-protective layer of magnetite, since the catalyzed hydroxyalkylhydroxylamine (e.g. HPHA) is believed to yield a faster reaction with oxygen, and will thus react faster with metal oxides present in the system turning non-protective hematite into magnetite. Due to the corrosion-protection layer of magnetite, corrosion products will be minimized. The oxygen scavenger composition as presently disclosed provides for less available dissolved oxygen and corrosion products present in applications, such as, but not limited to, sour water stripping, amine treating and/or glycol dehydration applications.

In some embodiments, the oxygen scavenger composition is a blend. In some embodiments, the hydroxyalkylhydroxylamine is N,N-bis(2-hydroxypropyl)hydroxylamine (HPHA). It is believed that due to HPHA being a highly branched molecule (i.e. more than DEHA and others), the disclosed oxygen scavenger is likely to react with dissolved oxygen faster and more effectively.

In some embodiments, the catalyst is a quinone catalyst. In some embodiments, wherein the quinone catalyst is hydroquinone, benzoquinone, or a blend thereof. In some embodiments, the hydroxyalkylhydroxylamine is N,N-bis(2-hydroxypropyl)hydroxylamine (HPHA) and the catalyst is hydroquinone.

In some embodiments, the oxygen scavenger composition further comprises N,N-bis(2-hydroxyethyl)hydroxylamine (HEHA), N,N-bis(2-hydroxybutyl)-hydroxylamine (HBHA), and/or diethylhydroxylamine (DEHA).

In some embodiments, the ratio of N,N-bis(2-hydroxypropyl)hydroxylamine (HPHA) to hydroquinone is about 0.0001:100 to about 100:0.0001, in other embodiments, about 50:0.0001 to about 0.0001:100, and in other embodiments, about 20:3 to about 30:3.

The method further provides for adding the oxygen scavenger composition to an aqueous feed and/or a hydrocarbon feed of a hydrocarbon processing system. It should be understood that the hydrocarbon processing system, includes, but is not limited to, a refinery, a natural gas processing system (including upstream and/or midstream applications), a coal gasification plant, an ammonia plant, or the like.

In some embodiments, the oxygen scavenger composition is added to the aqueous and/or hydrocarbon feed in an amount of 0.0001 ppm to about 50,000 ppm, in other embodiments, in an amount of 1 ppm to about 10,000 ppm, and in other embodiments, about 1 ppm to about 100 ppm. It should be understood that the oxygen scavenger composition can be added to the aqueous and/or hydrocarbon feed(s) by most any conventional chemical addition means. In some embodiments, the chemical additional and/or injection system comprises an injection quill of a material and design appropriate for the specific application.

In some embodiments, the aqueous and/or hydrocarbon feed comprises dissolved oxygen in a range of about 0.0001 ppm to about 50,000 ppm. In some embodiments, the aqueous feed comprises hydrocarbons, hydrogen sulfide, carbon dioxide, organic acids, phenols, dissolved minerals, alkanolamines, glycols, and/or oxygen. In some embodiments, the hydrocarbon feed is a sour gas or a liquid stream, or a blend thereof.

In some embodiments, the aqueous and/or hydrocarbon processing system comprises a sour water stripper, a glycol dehydration unit, or a hydrocarbon gas processing unit.

The disclosed oxygen scavenger composition and method minimizes fouling, corrosion, and solvent degradation in low-temperature applications. By utilizing the disclosed oxygen scavenger composition in low-temperature environments, the degradation rate of amines and glycols will be greatly diminished by the effective removal of dissolved oxygen in the low-temperature end of these processes. Such removal is due to the faster reaction rates of the disclosed oxygen scavenger composition with oxygen, as compared to other conventional technologies, which will prevent oxygen from complexing with amines and glycols as they contact each other.

In some embodiments, the hydrocarbon processing system is operated at a temperature range of about 40° F. to about 500° F. In some embodiments, the temperature range is less than 300° F.

In the foregoing specification, the invention has been described with reference to specific embodiments thereof. While embodiments of the disclosed technology have been described, it should be understood that the present disclosure is not so limited and modifications may be made without departing from the disclosed technology. The scope of the disclosed technology is defined by the appended claims, and all devices, processes, and methods that come within the meaning of the claims, either literally or by equivalence, are intended to be embraced therein.

The invention claimed is:

1. A method of oxygen scavenging, the method comprising:
   (i) providing an oxygen scavenger composition comprising a hydroxyalkylhydroxylamine and a catalyst; and
   (ii) adding the oxygen scavenger composition to an aqueous feed and/or a hydrocarbon feed of a hydrocarbon processing system,
   wherein the hydroxyalkylhydroxylamine is N,N-bis(2-hydroxypropyl)hydroxylamine, wherein the aqueous feed comprises hydrocarbons and dissolved oxygen, and wherein the hydrocarbon feed comprises dissolved oxygen.

2. The method as recited in claim 1, wherein the oxygen scavenger composition is a blend.

3. The method as recited in claim 1, wherein the catalyst is a quinone catalyst.

4. The method as recited in claim 3, wherein the quinone catalyst is hydroquinone, benzoquinone, or a blend thereof.

5. The method as recited in claim 1, wherein the catalyst is hydroquinone.

6. The method as recited in claim 1, wherein the oxygen scavenger composition further comprises N,N-bis(2-hydroxyethyl)hydroxylamine, N,N-bis(2-hydroxybutyl)hydroxylamine, and/or diethylhydroxylamine.

7. The method as recited in claim 5, wherein the ratio of N,N-bis(2-hydroxypropyl)hydroxylamine to hydroquinone is about 0.0001:100 to about 100:0.0001.

8. The method as recited in claim 1, wherein the oxygen scavenger composition is added to the aqueous and/or hydrocarbon feed in an amount of 0.0001 ppm to about 50,000 ppm.

9. The method as recited in claim 1, wherein the aqueous and/or hydrocarbon feed comprises dissolved oxygen in a range of about 0.0001 pm to about 50,000 ppm.

10. The method as recited in claim 1, wherein the aqueous feed further comprises at least one of: hydrogen sulfide, carbon dioxide, organic acids, phenols, dissolved minerals, alkanolamines, and glycols.

11. The method as recited in claim 1, wherein the hydrocarbon feed is a sour gas or a liquid stream, or a blend thereof.

12. The method as recited in claim 1, wherein the hydrocarbon processing system is a refinery, a natural gas processing system, a coal gasification plant, or an ammonia plant.

13. The method as recited in claim 1, wherein the aqueous and/or hydrocarbon processing system comprises a sour water stripper, a glycol dehydration unit, or a hydrocarbon gas processing unit.

14. The method as recited in claim 1, wherein the hydrocarbon processing system is operated at a temperature range of about 40° F. to about 500° F.

15. The method as recited in claim 14, wherein the temperature range is less than 300° F.

16. A method of oxygen scavenging, the method comprising:
   (i) providing an oxygen scavenger composition comprising N,N-bis(2-hydroxypropyl)hydroxylamine, a catalyst, and at least one of: N,N-bis(2-hydroxyethyl)hydroxylamine, N,N-bis(2-hydroxybutyl)hydroxylamine, and diethylhydroxylamine; and
   (ii) adding the oxygen scavenger composition to an aqueous feed and/or a hydrocarbon feed of a hydrocarbon processing system,
   wherein the aqueous feed comprises hydrocarbons and dissolved oxygen, and wherein the hydrocarbon feed comprises dissolved oxygen.

17. The method as recited in claim 16, wherein the aqueous feed further comprises at least one of olefins, alkanolamines, glycols, organic acids, aldehydes and phenols.

* * * * *